United States Patent
Lee et al.

(10) Patent No.: US 10,411,631 B2
(45) Date of Patent: Sep. 10, 2019

(54) METHOD AND APPARATUS FOR VIBRATION DAMPING IN A POWERTRAIN SYSTEM

(71) Applicant: GM GLOBAL TECHNOLOGY OPERATIONS LLC, Detroit, MI (US)

(72) Inventors: Young Joo Lee, Rochester, MI (US); Bon Ho Bae, Palo Alto, CA (US); Yo Chan Son, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 204 days.

(21) Appl. No.: 15/139,723

(22) Filed: Apr. 27, 2016

(65) Prior Publication Data
US 2017/0317631 A1   Nov. 2, 2017

(51) Int. Cl.
*H02P 21/05* (2006.01)
*F02D 31/00* (2006.01)
(Continued)

(52) U.S. Cl.
CPC .............. *H02P 21/05* (2013.01); *B60K 1/00* (2013.01); *B60K 6/00* (2013.01); *B60L 15/20* (2013.01);
(Continued)

(58) Field of Classification Search
CPC ...... F02D 31/00; F02D 41/021; B60W 10/06; B60W 10/08; B60W 20/00; H02P 6/10; H02P 6/17; H02P 21/05; H02P 27/085
(Continued)

(56) References Cited

U.S. PATENT DOCUMENTS

| | | | | |
|---|---|---|---|---|
| 4,984,988 A | * | 1/1991 | Mizushina | G01M 13/02 434/365 |
| 5,740,880 A | * | 4/1998 | Miller | B62D 5/046 180/446 |

(Continued)

FOREIGN PATENT DOCUMENTS

| | | |
|---|---|---|
| CN | 202071830 U | 12/2011 |
| CN | 103358932 A | 10/2013 |
| JP | 4669762 B2 * | 4/2011 |

OTHER PUBLICATIONS

Tilli, Andrea & Montanari, M. A low-noise estimator of angular speed and acceleration from shaft encoder measurements. 2001.*

*Primary Examiner* — John M Zaleskas
(74) *Attorney, Agent, or Firm* — Quinn IP Law

(57) ABSTRACT

A powertrain system including an electric machine rotatably coupled to a crankshaft of an internal combustion engine via a belt is described, wherein the electric machine is disposed to generate torque. A method for controlling the electric machine includes monitoring rotational position of the electric machine, and periodically executing a speed observer to determine a rotational speed of the electric machine based upon the monitored rotational position of the electric machine. An acceleration observer is periodically executed to determine an acceleration rate, wherein the acceleration rate is determined based upon a time-based change in the rotational speed of the electric machine. A virtual inertia term is determined based upon the acceleration rate, and a torque compensation term is determined based upon the virtual inertia term and the acceleration rate. The electric machine is controlled to generate torque based upon the torque compensation term.

15 Claims, 3 Drawing Sheets

(51) Int. Cl.
  *F02D 41/02* (2006.01)
  *H02P 27/08* (2006.01)
  *H02P 6/10* (2006.01)
  *H02P 6/17* (2016.01)
  *B60K 1/00* (2006.01)
  *H02P 6/08* (2016.01)
  *H02P 23/12* (2006.01)
  *F02N 11/04* (2006.01)
  *F02N 11/08* (2006.01)
  *B60L 15/20* (2006.01)
  *B60K 6/00* (2006.01)
  *B60L 50/15* (2019.01)
  *H02P 101/45* (2016.01)
  *F02N 15/08* (2006.01)
  *F02N 11/00* (2006.01)

(52) U.S. Cl.
  CPC ............. *B60L 50/15* (2019.02); *F02D 31/00* (2013.01); *F02D 41/021* (2013.01); *F02N 11/04* (2013.01); *F02N 11/0866* (2013.01); *H02P 6/08* (2013.01); *H02P 6/10* (2013.01); *H02P 6/17* (2016.02); *H02P 23/12* (2013.01); *H02P 27/085* (2013.01); *B60L 2240/421* (2013.01); *B60L 2240/423* (2013.01); *F02N 11/006* (2013.01); *F02N 15/08* (2013.01); *F02N 2011/0888* (2013.01); *F02N 2011/0896* (2013.01); *H02P 2101/45* (2015.01); *Y02T 10/644* (2013.01); *Y02T 10/645* (2013.01); *Y02T 10/7077* (2013.01); *Y02T 10/72* (2013.01); *Y02T 10/7275* (2013.01)

(58) Field of Classification Search
  USPC ...................................... 701/22, 99, 101, 110
  See application file for complete search history.

(56) References Cited

U.S. PATENT DOCUMENTS

| | | | | |
|---|---|---|---|---|
| 6,161,640 | A * | 12/2000 | Yamaguchi | B60K 6/445 180/197 |
| 7,469,761 | B2 * | 12/2008 | Kuras | B60K 6/46 180/65.245 |
| 2001/0034572 | A1 * | 10/2001 | Yamaguchi | B60K 6/365 701/22 |
| 2002/0079148 | A1 * | 6/2002 | Aoki | B60K 6/445 180/65.235 |
| 2003/0062206 | A1 * | 4/2003 | Fujikawa | B60K 6/383 180/65.25 |
| 2005/0104551 | A1 * | 5/2005 | Nishimura | H02P 21/08 318/719 |
| 2005/0159861 | A1 * | 7/2005 | Iwatsuki | B60K 6/445 701/22 |
| 2005/0167170 | A1 * | 8/2005 | Hisada | B60K 6/445 180/65.235 |
| 2005/0283283 | A1 * | 12/2005 | Hisada | B60K 6/445 701/22 |
| 2007/0103106 | A1 * | 5/2007 | Iwanaka | B60W 20/15 318/432 |
| 2007/0107961 | A1 * | 5/2007 | Iwanaka | B60K 6/40 180/65.6 |
| 2007/0241712 | A1 * | 10/2007 | Dwyer | G05B 19/045 318/567 |
| 2009/0118075 | A1 * | 5/2009 | Heap | B60K 6/445 477/3 |
| 2009/0118951 | A1 * | 5/2009 | Heap | B60K 6/365 701/56 |
| 2010/0038158 | A1 * | 2/2010 | Whitney | B60K 6/365 180/65.265 |
| 2010/0039053 | A1 * | 2/2010 | Matsutani | B23P 19/066 318/68 |
| 2011/0276207 | A1 * | 11/2011 | Falkenstein | B60K 6/442 701/22 |
| 2012/0026217 | A1 * | 2/2012 | Anzai | B41J 19/202 347/5 |
| 2012/0078457 | A1 * | 3/2012 | Tajima | B60K 6/48 701/22 |
| 2012/0101697 | A1 * | 4/2012 | Hawkins | F16H 61/061 701/51 |
| 2012/0303189 | A1 * | 11/2012 | Namuduri | B60W 20/00 701/22 |
| 2013/0297191 | A1 * | 11/2013 | Gibson | F02N 11/0855 701/112 |
| 2014/0088808 | A1 * | 3/2014 | Kawasaki | B60W 20/00 701/22 |
| 2014/0371967 | A1 * | 12/2014 | Miwa | B60K 6/445 701/22 |
| 2015/0105953 | A1 * | 4/2015 | Kim | B60L 15/2009 701/22 |
| 2015/0155812 | A1 * | 6/2015 | Jang | B60L 11/14 701/22 |
| 2015/0192689 | A1 * | 7/2015 | Li | G01N 23/04 250/393 |
| 2015/0314703 | A1 * | 11/2015 | Matsushima | B60L 15/2054 701/22 |
| 2015/0336570 | A1 * | 11/2015 | Sugimura | B60K 6/48 701/22 |
| 2015/0360694 | A1 * | 12/2015 | Tunhag | B60W 10/04 701/99 |
| 2016/0098019 | A1 * | 4/2016 | Kirshenboim | H02P 6/16 318/650 |
| 2017/0184039 | A1 * | 6/2017 | Evaldsson | F02D 41/0225 |
| 2017/0197629 | A1 * | 7/2017 | Redbrandt | B60W 30/20 |

\* cited by examiner

METHOD AND APPARATUS FOR VIBRATION DAMPING IN A POWERTRAIN SYSTEM

TECHNICAL FIELD

The present disclosure relates to powertrain systems for vehicles, and control related thereto.

BACKGROUND

Known vehicle powertrain systems include internal combustion engines and electric motor/generators that may be coupled to transmissions to transfer torque to a driveline of a vehicle for tractive effort. Known electric motor/generators are supplied electric power from high-voltage energy storage systems. Powertrain systems may employ regenerative control systems to recover electric power for charging the high-voltage energy storage system in response to operator commands that include braking and/or coasting. In one embodiment, torque may be transferred between the engine and the electric motor/generator via a belt-driven mechanism that rotatably couples the engine crankshaft and the rotor of the electric motor/generator. Mechanical vibration may be generated during torque transfer between the engine and the electric motor/generator due to various design and operating characteristics. The mechanical vibration may include periodic ripples that may generate an acoustic noise.

SUMMARY

A powertrain system including an electric machine rotatably coupled to a crankshaft of an internal combustion engine via a belt is described, wherein the electric machine is disposed to generate torque. A method for controlling the electric machine includes monitoring rotational position of the electric machine, and periodically executing a speed observer to determine a rotational speed of the electric machine based upon the monitored rotational position of the electric machine. An acceleration observer is periodically executed to determine an acceleration rate, wherein the acceleration rate is determined based upon a time-based change in the rotational speed of the electric machine. A virtual inertia term is determined based upon the acceleration rate, and a torque compensation term is determined based upon the virtual inertia term and the acceleration rate. The electric machine is controlled to generate torque based upon the torque compensation term.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 2-1 schematically shows a flowchart for a motor speed monitoring routine for determining rotational speed and acceleration rate of an electric machine that may be employed on an embodiment of the powertrain system described with reference to FIG. 1, in accordance with the disclosure;

FIG. 2-2 schematically shows a flowchart for a torque determination routine for determining a torque command for an embodiment of an electric machine that may be employed on an embodiment of the powertrain system described with reference to FIG. 1, in accordance with the disclosure.

DETAILED DESCRIPTION

Figure 1:
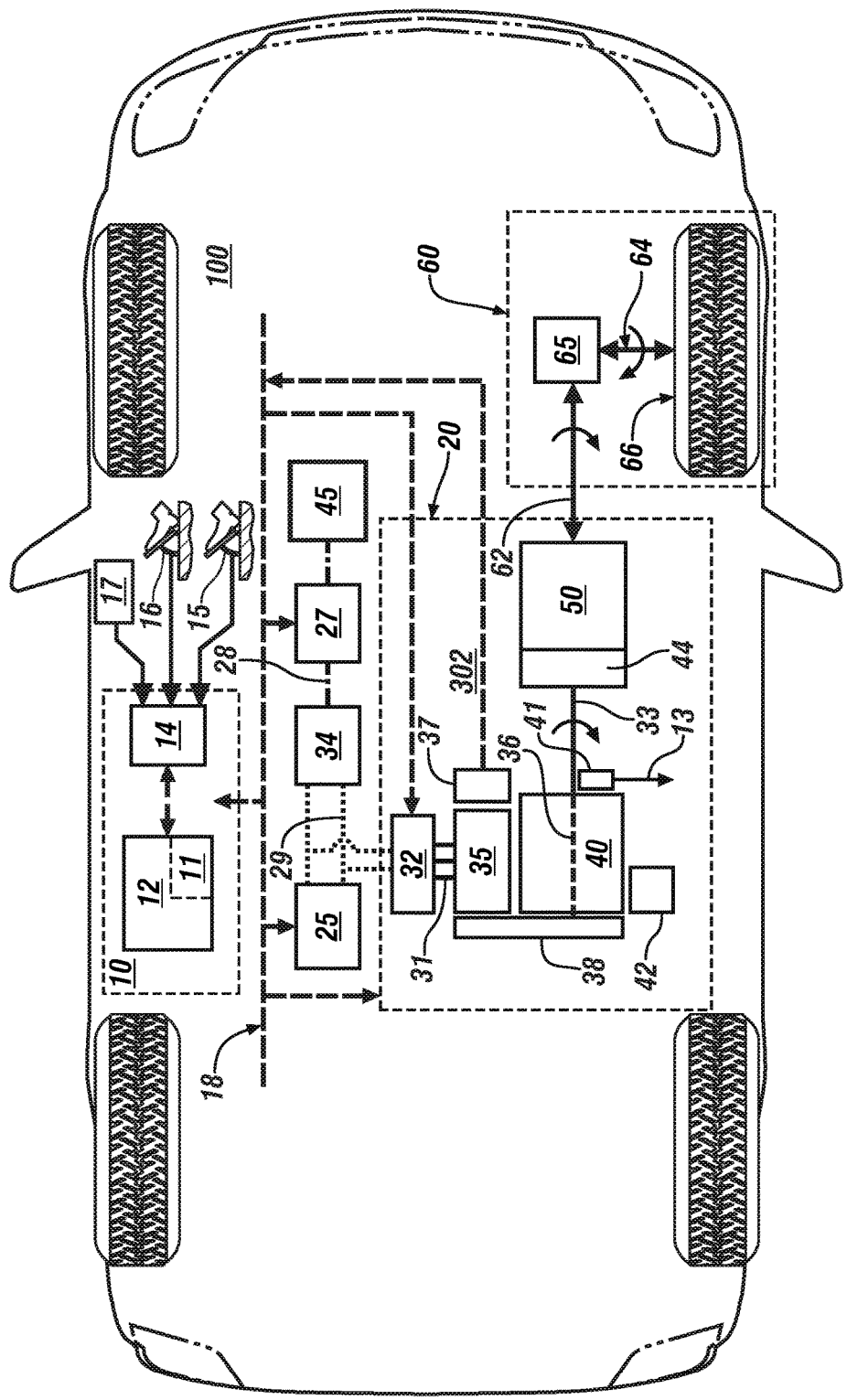
FIG. 1 schematically illustrates a vehicle including a powertrain system that includes an internal combustion engine having a crankshaft that couples to an electric machine via a pulley mechanism including a serpentine belt, in accordance with the disclosure.

Referring now to the drawings, which are provided for the purpose of illustrating certain exemplary embodiments only and not for the purpose of limiting the same, FIG. 1 schematically illustrates a vehicle 100 including a powertrain system 20 including an internal combustion engine 40 having a crankshaft 36 that couples to an electrically-powered torque machine (electric machine) 35 via a pulley mechanism 38 that includes a serpentine belt and controlled by a control system 10. The crankshaft 36 of the internal combustion engine 40 also rotatably couples via a torque converter 44 to a transmission 50 that is coupled to a driveline 60. Like numerals refer to like elements throughout the description.

The electric machine 35 and the internal combustion engine 40 are torque-generating devices. The electric machine 35 includes an output member that mechanically rotatably couples to the crankshaft 36 of the engine 40 via the pulley mechanism 38, which provides a mechanical power path therebetween. The pulley mechanism 38 is configured to effect torque transfer between the engine 40 and the electric machine 35, including transferring torque from the electric machine 35 to the engine 40 for engine autostart/autostop operation, tractive torque assistance, and regenerative braking, and transferring torque from engine 40 to the electric machine 35 for high-voltage electrical charging. In one embodiment, the pulley mechanism 38 includes a serpentine belt routed between the pulley attached to the crankshaft 36 of the engine 40 and another pulley attached to the output member of the electric machine 35, wherein the output member of the electric machine 35 which may be a rotatable shaft coupled to a rotor of the electric machine 35. Such as system may be referred to as a belt-alternator-starter (BAS) system. Alternatively, the pulley mechanism 38 may include any suitable torque coupling mechanism, such as a positive-displacement gearing mechanism or a flexible chain. The transmission 50 includes an output member 62 that couples to the driveline 60. In one embodiment, the engine 40 may include a low-voltage solenoid-actuated electrical starter 42 for starting in response to a key-crank event in one embodiment.

The engine 40 is preferably a multi-cylinder internal combustion engine that converts fuel to mechanical power through a combustion process. The engine 40 is equipped with a plurality of actuators and sensing devices for monitoring operation and delivering fuel to form a combustion charge to produce torque that is responsive to an output torque request. The sensing devices may include a crankshaft position sensor 41, which can be any suitable rotational position sensing system, and preferably directly communicates via a wiring harness 13 to control module 12 and communicates via a communications bus 18 to inverter controller 11. Alternatively, the crankshaft position sensor 41 directly communicates via wiring harness 13 to control module 12 and directly communicates via a second wiring harness to inverter controller 11.

The electric machine 35 is preferably a high-voltage multi-phase electric motor/generator configured to convert stored electric energy to mechanical power and convert mechanical power to electric energy that may be stored in a high-voltage DC power source (battery) 25. The electric machine 35 includes a rotor and a stator and an accompanying motor position sensor 37, which may be a resolver, a Hall effect sensor, or another suitable rotational position sensing mechanism. The motor position sensor 37 communicates directly to the inverter controller 11 via harness 33 and is employed to monitor rotational position of the rotor of the electric machine 35, i.e., a motor position ($\theta_m$) 302. The motor position ($\theta_m$) 302 of the electric machine 35 is analyzed in the inverter controller 11 to control operation of an inverter module 32 that controls the electric machine 35, with such analysis described with reference to FIGS. 2-1, 2-2 and 3. The inverter controller 11 is preferably co-located within the inverter module 32 (as shown) or, alternatively, may be remotely located, e.g., within control module 12.

The high-voltage battery 25 electrically connects to the inverter module 32 via a high-voltage DC bus 29 to transfer high-voltage DC electric power to the electric machine 35 in response to control signals originating in the control system 10. The inverter module 32 electrically connects to the electric machine 35 via a multi-phase motor control power bus 31. The inverter module 32 is configured with suitable control circuits including power transistors, e.g., IGBTs for transforming high-voltage DC electric power to high-voltage AC electric power and transforming high-voltage AC electric power to high-voltage DC electric power. The inverter module 32 preferably employs pulsewidth-modulating (PWM) control to convert stored DC electric power originating in the high-voltage battery 25 to AC electric power to drive the electric machine 35 to generate torque. Similarly, the inverter module 32 converts mechanical power transferred to the electric machine 35 to DC electric power to generate electric energy that is storable in the high-voltage battery 25, including as part of a regenerative control strategy. It is appreciated that the inverter module 32 is configured to receive motor control commands and control inverter states to provide the motor drive and regeneration functionality.

In one embodiment, a DC/DC electric power converter 34 electrically connects to a low-voltage bus 28 and a low-voltage battery 27, and electrically connects to the high-voltage bus 29. Such electric power connections are known and not described in detail. The low-voltage battery 27 may electrically connect to an auxiliary power system 45 to provide low-voltage electric power to low-voltage systems on the vehicle, including, e.g., electric windows, HVAC fans, seats, and the low-voltage solenoid-actuated electrical starter 42 in one embodiment. Alternatively, the electric power converter 34 may provide low-voltage electric power to the low-voltage systems on the vehicle, thus supplanting the auxiliary power system 45.

The torque converter 44 is a rotatable torque coupling device arranged between the engine 40 and the transmission 50. The torque converter 44 preferably includes fluid torque coupling via an internal pump and vanes and mechanical torque coupling via a controllable clutch mechanism.

The transmission 50 may be arranged in a step-gear configuration, and may include one or more differential gear sets and activatable clutches configured to effect torque transfer in one of a plurality of step-gear states over a range of speed ratios between the engine 40 and the output member 62. The transmission 50 includes any suitable configuration, and may be configured as an automatic transmission to automatically shift between the step-gear states to operate at a gear ratio that achieves a preferred match between an output torque request and an engine operating point. Operation of the transmission may be controlled by a transmission controller 55, which preferably communicates with the controller 12. The driveline 60 may include a differential gear device 65 that mechanically couples to an axle 64 or half-shaft that mechanically couples to a wheel 66 in one embodiment. The driveline 60 transfers tractive power between the transmission 50 and a road surface. The powertrain system 20 is illustrative, and the concepts described herein apply to other powertrain systems that are similarly configured.

The control system 10 includes control module 12 that communicates to an operator interface 14. The control module 12 preferably communicates with individual elements of the powertrain system 20 either directly or via the communications bus 18. The control module 12 communicates to the sensing devices of each of the high-voltage battery 25, the inverter module 32, the electric machine 35, the engine 40 and the transmission 50 to monitor operation and determine parametric states thereof. The operator interface 14 of the vehicle 100 includes a plurality of human/machine interface devices through which the vehicle operator commands operation of the vehicle 100, including, e.g., an ignition switch to enable an operator to crank and start the engine 40, an accelerator pedal 15, a brake pedal 16, a transmission range selector (PRNDL) 17, a steering wheel, and a headlamp switch. The accelerator pedal 15 provides signal input including an accelerator pedal position indicating an operator request for vehicle acceleration and the brake pedal 16 provides signal input including a brake pedal position indicating an operator request for vehicle braking. The transmission range selector 17 provides signal input indicating direction of operator-intended motion of the vehicle including a discrete number of operator-selectable positions indicating the preferred rotational direction of the output member 62 in either a forward or a reverse direction.

Communication in the form of sensor signals and actuator command signals between the control system 10 and elements of the powertrain system 20 may be accomplished using one or more communications systems and devices, including, e.g., the communications bus 18, a direct connection, a local area network bus, a serial peripheral interface bus, and wireless communications.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 2 milliseconds during ongoing operation. Alternatively, routines may be executed in response to occurrence of a triggering event. Communication between controllers, and communication between controllers, actuators and/or sensors may be accomplished using a direct wired link, a networked communications bus link, a wireless link or any another suitable communications link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Embodiments of the powertrain system 20 and vehicle 100 described with reference to FIG. 1 may experience vibration that may cause acoustic noise generation when either the engine 40 or the electric machine 35 is generating torque. Such vibration may include periodic ripples of motor shaft speed, which may contain a signature of vibration. As described with reference to FIGS. 2-1, 2-2 and 3, a virtual inertia term may be determined based upon an acceleration rate that is extracted from motor shaft speed ripples, and an equivalent inertia may be determined, and adjusted via a calibration. Once the virtual inertia torque is calculated, it can be added to a torque command to produce a final torque command for the electric machine 35 in order to mitigate speed ripple and thus minimize or eliminate noise and vibration, preferably without adding or redesigning hardware. Such a configuration accommodates vehicle-to-vehicle variation by eliminating the involvement of engine crank position monitoring.

Those having ordinary skill in the art will recognize that the teachings may be described herein in terms of functional and/or logical block components and/or various processing steps. It should be realized that such block components may be composed of any number of hardware, software, and/or firmware components configured to perform the specified functions.

Figures 1, 2:
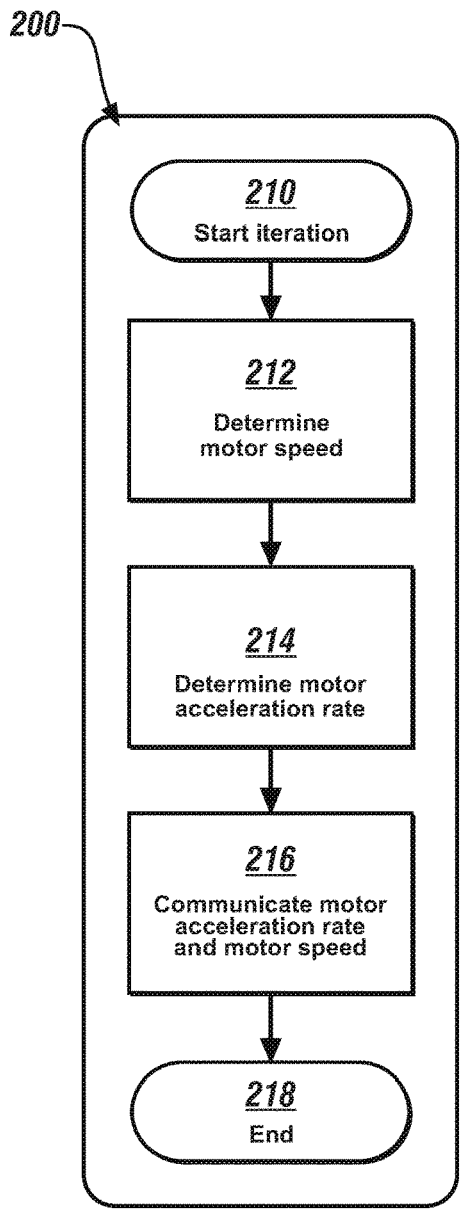
Figure 2:
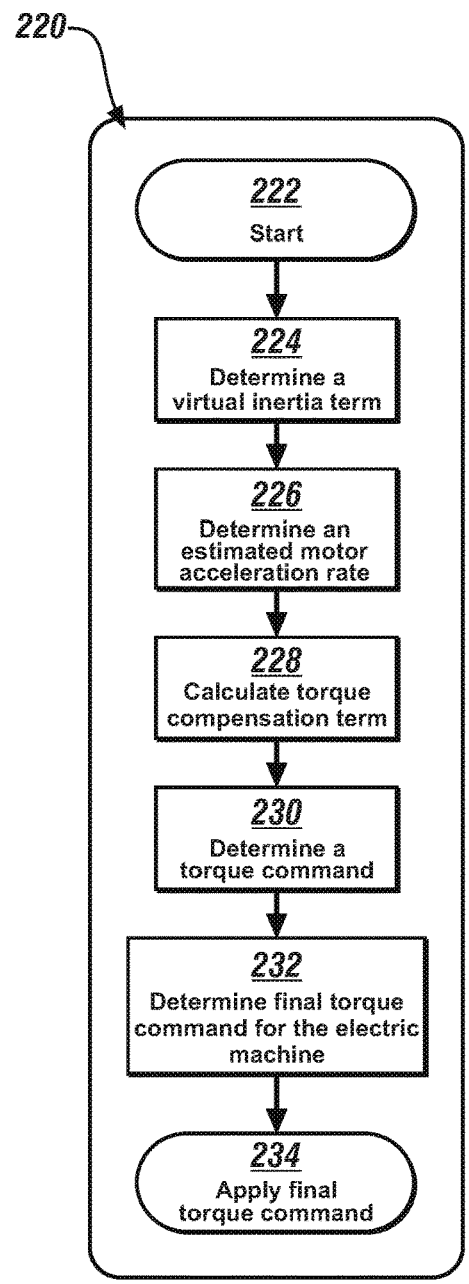

FIG. 2-1 schematically shows a flowchart depicting a motor speed monitoring routine 200 for determining rotational speed and acceleration rates of an electric machine, e.g., an embodiment of the electric machine 35 employed on an embodiment of the powertrain system 20 described with reference to FIG. 1. Table 1 is provided as a key wherein the numerically labeled blocks and the corresponding functions are set forth as follows.

TABLE 1

| BLOCK | BLOCK CONTENTS |
| --- | --- |
| 210 | Start iteration |
| 212 | Determine motor speed ($\omega_m$) from motor position ($\theta_m$) |
| 214 | Determine motor acceleration rate ($\alpha_m$) from motor speed ($\omega_m$) |
| 216 | Communicate motor acceleration rate ($\alpha_m$) and motor speed ($\omega_m$) |
| 218 | End |

The motor speed monitoring routine 200 is preferably periodically executed at a relatively fast repetition rate, which may be a first periodic rate having a 100 μs repetition rate in one embodiment. Each iteration (210), a raw motor position ($\theta_m$) is monitored, and motor speed ($\omega_m$) is determined therefrom (212), based upon the elapsed time since the last iteration of the speed monitoring routine 200. A motor acceleration rate ($\alpha_m$) is determined, and preferably is a time-based change in the motor speed from the motor speed that was determined during the previous iteration of the routine 200 (214). The motor acceleration rate ($\alpha_m$) and the motor speed ($\omega_m$) are communicated, preferably as a message on the communications bus (216), and this iteration ends (218). The motor speed ($\omega_m$) may be determined as an estimated motor speed $\omega_{est}$, and the motor acceleration rate ($\alpha_m$) may be determined as an estimated motor acceleration rate $\alpha_{est}$. This described with reference to FIG. 3.

Figure 3:
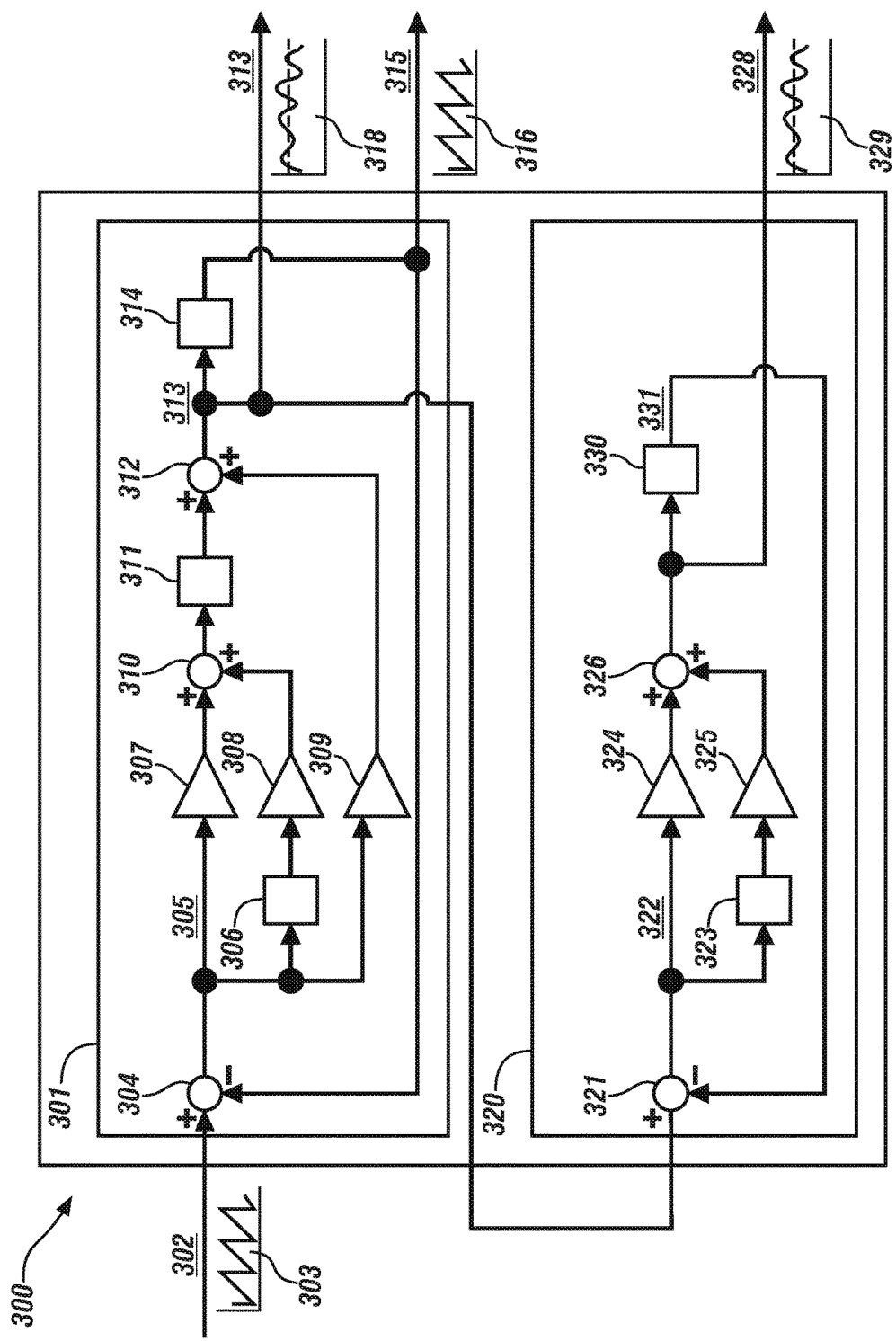
FIG. 3 schematically shows details of an analytical process that may be employed by the motor speed monitoring routine described with reference to FIG. 2-1 to determine motor speed based upon a motor position, wherein the motor speed is an estimated motor speed based upon the motor position, and the motor acceleration rate is an estimated motor acceleration rate that is based upon the estimated motor speed, in accordance with the disclosure.

FIG. 3 schematically shows details of an analytical process 300 for determining motor speed based upon a motor position. The analytical process 300 may be an observer-based estimation method, which includes a speed observer 301 that is arranged with an acceleration observer 320 in a cascaded form to determine an estimated motor speed $\omega_{est}$ 313 and an estimated motor acceleration rate $\alpha_{est}$ 328.

The speed observer 301 estimates motor speed $\omega_{est}$ 313 based upon a raw measured motor position $\theta_m$ 302. The speed observer 301 may be configured as a position observer analytical model that operates as follows. The raw motor position $\theta_m$ 302 is determined based upon a signal output from the motor position sensor 37, and preferably is a numerical value between 0 and $2\pi$ radians, representing a rotational position of the rotor of the electric machine 35 that is periodically measured, e.g., by the rotational position sensor 37. Examples of the raw motor position $\theta_m$ 302 are shown graphically with reference to element 303. A difference operator 304 calculates a numerical difference 305 between the raw motor position $\theta_m$ 302 and an estimated motor position $\theta_{est}$ 315. The numerical difference 305 is provided as input to a proportional-integral-derivative analyzer that includes a proportional element 307, an integral element 308 and a derivative element 309.

The proportional element 307 multiplies the numerical difference 305 and a proportional gain term $K_{p\omega}$ to generate a first resultant. The numerical difference 305 is subjected to a first integration operator 306, which generates a term that is multiplied by the integral gain term $K_{i\omega}$, in the integral element 308 to generate a second resultant, and the first and second resultants are combined using an addition operator 310, and integrated in a second integration operator 311.

The derivative element 309 multiplies the numerical difference 305 and the derivative gain term $K_{d\omega}$ to generate a third resultant, which is combined with the first resultant in another addition operator 312 to determine the estimated motor speed $\omega_{est}$ 313, an example of which is shown graphically by element 318.

The proportional gain term $K_{p\omega}$, the integral gain term $K_{i\omega}$, and derivative gain term $K_{d\omega}$ are application-specific gain terms that are tuned to achieve a value for the estimated motor speed $\omega_{est}$ 313 that approximates the actual motor speed when the electric machine is operating over a range of operating conditions.

The estimated motor speed $\omega_{est}$ 313 is subjected to an estimation algorithm 314 that estimates the motor position $\theta_{est}$ 315 based upon $$\theta_{est} = K_{\omega 2\theta} \textstyle\int dt$$

The estimated motor position $\theta_{est}$ 315, shown graphically with reference to element 316, is provided as feedback for comparison with the raw motor position $\theta_m$ 302 at the difference operator 304. The estimated motor speed $\omega_{est}$ 313 for this iteration is provided as input to the acceleration observer 320 to determine the estimated motor acceleration rate $\alpha_{est}$ 328. The acceleration observer 320 calculates, via a difference operator 321, a numerical difference 322 between the estimated motor speed $\omega_{est}$ 313 and a second estimated motor speed $\omega'_{est}$ 331, which is determined as described herein. The numerical difference 322 is provided as input to a proportional-integral analyzer that includes a proportional element 324 and an integral element 325.

The proportional element 324 multiplies the numerical difference 322 and a proportional gain term $K_{p\alpha}$ to generate a first resultant. The numerical difference 305 is subjected to a third integration operator 323, which generates a term that is multiplied by the integral gain term $K_{i\alpha}$ in the integral element 325 to generate a second resultant, and the first and second resultants are combined using an addition operator 326 to determine the estimated motor acceleration rate $\alpha_{est}$ 328. The estimated motor acceleration rate $\alpha_{est}$ 328 is shown graphically by element 329. The estimated motor acceleration rate $\alpha_{est}$ 328 is subjected to a fourth integration operator 330 to determine the second estimated motor speed $\omega'_{est}$ 331. The proportional gain term $K_{p\alpha}$ and the integral gain term $K_{i\alpha}$ are application-specific gain terms that are tuned to achieve a value for the estimated motor acceleration rate $\alpha_{est}$ 328 that approximates the actual motor acceleration when the electric machine is operating over a range of operating conditions.

FIG. 2-2 schematically shows a flowchart depicting a torque determination routine 220 for determining a torque command for an embodiment of an electric machine, e.g., an embodiment of the electric machine 35 employed on an embodiment of the powertrain system 20 described with reference to FIG. 1. The torque command incorporates a virtual inertia torque term that accommodates speed ripples on the shaft of the rotor of the electric machine. The speed ripples on the shaft of the rotor of the electric machine 35 reflect a vibration signature related to torque that is transferred through the pulley mechanism 38 between the crankshaft 36 of the engine 40 and the electric machine 35. Table 2 is provided as a key wherein the numerically labeled blocks and the corresponding functions are set forth as follows.

TABLE 2

| BLOCK | BLOCK CONTENTS |
|---|---|
| 222 | Start iteration |
| 224 | Determine a virtual inertia term, $J_{virtual}$ |

TABLE 2-continued

| BLOCK | BLOCK CONTENTS |
|---|---|
| 226 | Determine an estimated motor acceleration rate $\alpha_{est}$ |
| 228 | Calculate torque compensation term $T^*_{em\_cmp}$ based upon virtual inertia term, $J_{virtual}$ and estimated motor acceleration rate $\alpha_{est}$ |
| 230 | Determine a torque command $T^*_{em\_hcp}$ |
| 232 | Determine final torque command for the electric machine $T^*_{em}$ based upon the torque command $T_{em\_hcp}$ and the torque compensation term $T^*_{em\_cmp}$ |
| 234 | Apply final torque command for the electric machine $T^*_{em}$ and end iteration |

The torque determination routine 220 is preferably periodically executed at a relatively slow repetition rate, which may be a second period rate having a 2.083 ms repetition rate in one embodiment. Each iteration (222), a virtual inertia term $J_{virtual}$ is determined based upon a predetermined calibration that estimates the expected inertial term for the present speed and torque operating point of the electric machine (224).

The predetermined calibration for the virtual inertia term $J_{virtual}$ is an application-specific array of values that may be calculated, estimated or otherwise determined, and is based upon rotating masses, bearing frictions, and other elements that are related to specific factors of the electric machine 35, the pulley mechanism 38 and the crankshaft 36 of the engine 40. The application-specific array of values for the virtual inertia term $J_{virtual}$ may be predetermined and stored in a memory device for retrieval.

A present value for the estimated motor acceleration rate $\alpha_{est}$ is determined from the output of the motor speed monitoring routine 200, and a torque compensation term $T^*_{cmp}$ is calculated, preferably by multiplying the virtual inertia term $J_{virtual}$ and the estimated motor acceleration rate $\alpha_{est}$ (228). A motor torque command $T^*_{em\_hcp}$ for the electric machine is captured or otherwise determined from the controller 12 (230), and is based upon factors related to a magnitude of the operator request for vehicle acceleration, a magnitude of the operator request for vehicle braking, a state-of-charge of the high-voltage battery 25 and other factors.

A final torque command for the electric machine $T^*_{em}$ is determined by combining the motor torque command $T^*_{em\_hcp}$ and the torque compensation term $T^*_{em\_cmp}$ (232). The final torque command for the electric machine $T^*_{em}$ is communicated to the motor controller for implementation, and this iteration ends (234). As such, the control routine 200 may be employed to reduce noise generation on embodiment of the powertrain system described with reference to FIG. 1. Furthermore, latencies associated with determining motor speed and acceleration, and employment thereof related to determining a final torque command for the electric machine may be reduced, thus improving responsiveness.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling an electric machine disposed to generate torque in a powertrain system, wherein the powertrain system includes the electric machine rotatably coupled to a crankshaft of an internal combustion engine, the method comprising:
   monitoring a rotational position of the electric machine to determine a raw motor position during a first iteration, a second iteration, and a third iteration;
   periodically executing a speed observer, via a controller, including:
   determining, during the first iteration, a first estimated motor position,
   determining, during the second iteration, a first difference between the raw motor position determined during the second iteration and the first estimated motor position, and subjecting the first difference to a proportional-integral-derivative analysis to determine a first estimated motor speed of the electric machine,
   determining the second estimated motor position based upon the first estimated motor speed, and
   determining, during the third iteration, a second difference between the raw motor position determined during the third iteration and the second estimated motor position, and subjecting the second difference to a proportional-integral-derivative analysis to determine a second estimated motor speed of the electric machine;
   periodically executing an acceleration observer to determine an acceleration rate of the electric machine, wherein the acceleration rate of the electric machine is determined based upon a time-based change in the estimated rotational motor speed of the electric machine between the second estimated motor speed and the first estimated motor speed;
   determining, via the controller, a virtual inertia term for the electric machine;
   determining a torque compensation term for the electric machine based upon the virtual inertia term and the acceleration rate; and
   controlling the electric machine to generate torque that is transferred to the crankshaft of the internal combustion engine based upon the torque compensation term.

2. The method of claim 1, further comprising controlling the electric machine to generate torque that is transferred to the crankshaft of the internal combustion engine based upon the torque compensation term and a motor torque command.

3. The method of claim 1, wherein monitoring rotational position of the electric machine comprises monitoring signal output from a position sensor arranged to monitor rotational position of a rotor of the electric machine.

4. The method of claim 1, wherein determining the virtual inertia term comprises selecting the virtual inertia term from an array of inertia terms determined for the electric machine based upon a speed and torque operating point of the electric machine.

5. The method of claim 1, wherein determining the torque compensation term based upon the virtual inertia term and the acceleration rate comprises multiplying the virtual inertia term and the acceleration rate.

6. The method of claim 1, comprising:
   periodically executing the speed observer and the acceleration observer at a first periodic rate; and
   determining the torque compensation term based upon the virtual inertia term and the acceleration rate at a second periodic rate;
   wherein the first periodic rate is greater than the second periodic rate.

7. The method of claim 6, wherein the first periodic rate comprises a 2 microsecond rate and the second periodic rate comprises a 100 microsecond rate.

8. The method of claim 1, wherein controlling the motor torque based upon the torque compensation term comprises determining a torque command for the electric machine, and adjusting the torque command for the electric machine based upon the torque compensation term.

9. A method for controlling an electric machine disposed to generate torque in a powertrain system, wherein the powertrain system includes the electric machine rotatably coupled to a crankshaft of an internal combustion engine that is coupled via a torque converter to a transmission, and wherein an output member of the transmission is coupled to an axle of a driveline, the method comprising:
   monitoring a rotational position of the electric machine to determine a raw motor position during a first iteration, a second iteration, and a third iteration;
   periodically determining, at a first periodic rate, an estimated speed of the electric machine and an acceleration rate of the electric machine, including:
   determining, during the first iteration, a first estimated motor position,
   determining, during the second iteration, a first difference between the raw motor position determined during the second iteration and the first estimated motor position, and subjecting the first difference to a proportional-integral-derivative analysis to determine a first estimated motor speed of the electric machine,
   determining the second estimated motor position based upon the first estimated motor speed,
   determining, during the third iteration, a second difference between the raw motor position determined during the third iteration and the second estimated motor position, and subjecting the second difference to a proportional-integral-derivative analysis to determine a second estimated motor speed of the electric machine, and periodically executing an acceleration observer to determine the acceleration rate of the electric machine, wherein the acceleration rate of the electric machine is determined based upon a time-based change in the estimated motor speed of the electric machine between the second estimated motor speed and the first estimated motor speed;
   periodically determining, at a second periodic rate, a virtual inertia term, and a torque compensation term for the electric machine based upon the virtual inertia term and the acceleration rate, wherein the first periodic rate is greater than the second periodic rate; and
   controlling the electric machine to generate torque that is transferred to the crankshaft of the internal combustion engine based upon the torque compensation term.

10. A powertrain system, comprising:
   an electric machine rotatably coupled to a crankshaft of an internal combustion engine, and a controller;
   the controller operatively connected to the internal combustion engine and the electric machine, the controller including an instruction set, the instruction set executable to:
   monitor, via a position sensor, a rotational position of the electric machine to determine a raw motor position during a first iteration, a second iteration, and a third iteration;
   determine, during the first iteration, a first estimated motor position,
   determine, during the second iteration, a first difference between the raw motor position determined during the second iteration and the first estimated motor position, and subjecting the first difference to a proportional-integral-derivative analysis to determine a first estimated motor speed of the electric machine, determine the second estimated motor position based upon the first estimated motor speed, and determine, during the third iteration, a second difference between the raw motor position determined during the third iteration and the second estimated motor position, and subjecting the second difference to a proportional-integral-derivative analysis to determine a second estimated motor speed of the electric machine;

periodically execute an acceleration observer to determine an acceleration rate of the electric machine, wherein the acceleration rate of the electric machine is determined based upon a time-based change in the estimated motor speed of the electric machine between the second estimated motor speed and the first estimated motor speed;

determine a virtual inertia term for the electric machine;

determine a torque compensation term for the electric machine based upon the virtual inertia term and the estimated acceleration rate; and control the electric machine to generate torque that is transferred to the crankshaft of the internal combustion engine based upon the torque compensation term.

11. The powertrain system of claim 10, wherein the instruction set is further executable to control the electric machine to generate torque based upon the torque compensation term and a motor torque command.

12. The powertrain system of claim 10, wherein the instruction set is executable to determine the virtual inertia term from a predetermined array of inertia terms that are based upon a speed and torque operating point of the electric machine.

13. The powertrain system of claim 10, wherein the instruction set is executable to determine the torque compensation term based upon the virtual inertia term and the acceleration rate by multiplying the virtual inertia term and the acceleration rate.

14. The powertrain system of claim 10, comprising the instruction set executable to determine a torque command for the electric machine, and adjust the torque command for the electric machine based upon the torque compensation term.

15. The powertrain system of claim 10, wherein the electric machine rotatably couples to the crankshaft of the internal combustion engine via a continuous belt.

* * * * *